United States Patent Office 3,608,147
Patented Sept. 28, 1971

3,608,147
APPARATUS FOR FORMING INTERLOCKABLE SLIDE FASTENER STRINGERS FROM A COILED FILAMENT
Walter O. Galonska, Great Neck, N.Y., assignor to Henry Rogers, New York, N.Y.
Filed Jan. 23, 1969, Ser. No. 793,362
Int. Cl. B29c 3/00, 15/00, 17/02
U.S. Cl. 18—19C                    12 Claims

ABSTRACT OF THE DISCLOSURE

Apparatus for forming interlockable slide fastener stringers wherein a filament loosely coiled over an elongated rod-shaped mandrel is moved in longitudinal direction over an elongated mandrel portion having a cross section larger than the remainder of the mandrel and a substantially oval outline by rotating pressure roll means encompasing the mandrel and the coil thereon in the region of the enlarged mandrel portion, and wherein the pressure roll means and the mandrel portion of enlarged cross section are arranged relative to each other in such a manner so as to deform the coil to provide interlocking heads on the convolutions ttheroef adapted to interlock with the heads of a second corresponding coil.

BACKGROUND OF THE INVENTION

Whereas in former times slide fasteners have been made exclusively with interlocking elements formed from metal, in recent years the slide fastener industry has used to an increasing extent plastic material for forming the interlocking elements of slide fasteners. The interlocking elements of plastic material for slide fasteners are usually produced from a plastic filament, for instance a nylon filament, which is first formed into a coil, and this coil is subsequently deformed into properly spaced and properly shaped integrally connected interlocking elements so as to form a stringer which is to be connected in any suitable manner, for instance by sewing, to a carrier band to be interlocked in the usual manner with a corresponding stringer.

In order to deform the plastic coil to provide properly spaced interlocking heads, pressure or deforming rolls are commonly used so as to provide for a continuous process resulting in a large output.

Slide fasteners are produced to different sizes and the pressure and deforming rolls known in the art have the disadvantage that different rolls have to be used for properly deforming plastic coils into slide fasteners of different sizes. Furthermore, pressure and deforming rolls known in the art are often formed with complicated profiles so that the manufacture of these rolls is extremely expensive. The rolls known in the art are also usually of large diameter which further increases the cost of such rolls.

It is an object of the persent invention to provide for an apparatus for forming interlockable slide fastener stringers from prefromed plastic coils which avoids the above-mentioned disadvantages of such apparatus known in the art.

It is a further object of the present invention to provide for an apparatus of the aforementioned type which can be adapted quickly and conveniently for producing slide fastener stringers of different size.

It is an additional object of the present invention to provide for an apparatus of the aforementioned kind which is composed of relatively few and simple parts so that the apparatus may be manufactured at reasonable cost and will stand up properly under extended use.

SUMMARY OF THE INVENTION

With these objects in view, the apparatus according to the present invention for forming interlockable slide fastener stringers from coiled plastic filaments mainly comprises an elongated rod-shaped mandrel adapted to receive a coiled plastic filament in which the mandrel has intermediate its ends an elongated portion having a cross section of substantially oval outline and being larger than the cross section of the remainder of the mandrel so that the coiled filament is transversely stretched in the direction of the larger axis of the oval during passing over the mandrel portion of larger cross section. The apparatus includes further pressure roll means in the region of the portion of larger cross section of the mandrel arranged to encompass the mandrel and the coiled filament thereon for pressing the transversely stretched filament coil against the outer surface of the mandrel to thereby deform a portion of each coil convolution and to stretch the coil in longitudinal direction. The pressure roll means are turnably supported on appropriate support means of the apparatus and drive means are connected to the pressure roll means for rotating the same at appropriate speed.

The pressure roll means preferably comprise a pair of first pressure rolls mounted on the support means rotatable about substantial parallel axes located in a plane extending substantially normal to the longitudinal direction of the mandrel and having peripheral surfaces engaging the coil, a third pressure coil coaxially arranged with one of the pair of pressure rolls and having a side face engaging the coil at one side thereof, and a fourth pressure roll having an axis in said plane and inclined at an angle relative to the axes of the first pair of pressure rolls, and this fourth pressure roll having a conical face arranged to engage the coil on the side thereof opposite from the side engaged by said face of said third pressure roll and along a line substantially parallel to said face.

The larger cross section of the mandrel is preferably defined by a pair of substantially parallel side faces and a pair of curved faces connecting the side faces and the peripheral surfaces of said first pair of pressure rolls press portions of the coil against the curved faces of the mandrel whereas the faces of said third and fourth pressure rolls are arranged to press coil portions against the parallel side faces of the mandrel. One of the curved faces of the mandrel cross section has preferably a smaller radius of curvature than the other of the curved faces and the peripheral surface of one of the pair of first pressure rolls defines with said one curved surface of the mandrel portion a gap having a minimum distance which is smaller than the diameter of the filament so as to deform the filament portion passing through the gap into interlockable heads extending in longitudinal direction of the coiled filament. The peripheral surfaces of the pair of first pressure rolls and the side face of the third pressure roll are preferably serrated whereas the conical face of the fourth pressure roll has preferably a peripheral serrated portion adjacent the other curved face of the mandrel cross section and a smooth peripheral surface portion adjacent said one curved face of smaller radius of curvature. The smooth surface portion of the conical face of the fourth pressure roll may also be set back relative to its serrated surface portion so that only the serrated surface portion of the conical face will engage the coil. This serrated surface portion of the fourth pressure roll may be spaced from the facing side face of the mandrel a distance smaller than the diameter of the coiled filament so as to flatten the filament portions passing between the serrated surface portion of the fourth pressure roll and the corresponding portion of the facing side face of the mandrel.

The support means are constructed and the pressure rolls mounted thereon in such a manner that the distance between the parallel axes of the first pair of pressure rolls may be adjusted and that the fourth pressure roll is movable toward and away from the side face of the third pressure roll so as to adjust the position of the rolls relative to each other for manufacturing of interlockable slide fastener stringers of different size.

The apparatus further includes heating means for heating the coiled filament before it is engaged by the pressure rolls to facilitate deforming of the coil convolutions.

DESCRIPTION OF THE PREFERRED EMBODIMENTS

Figure 1:
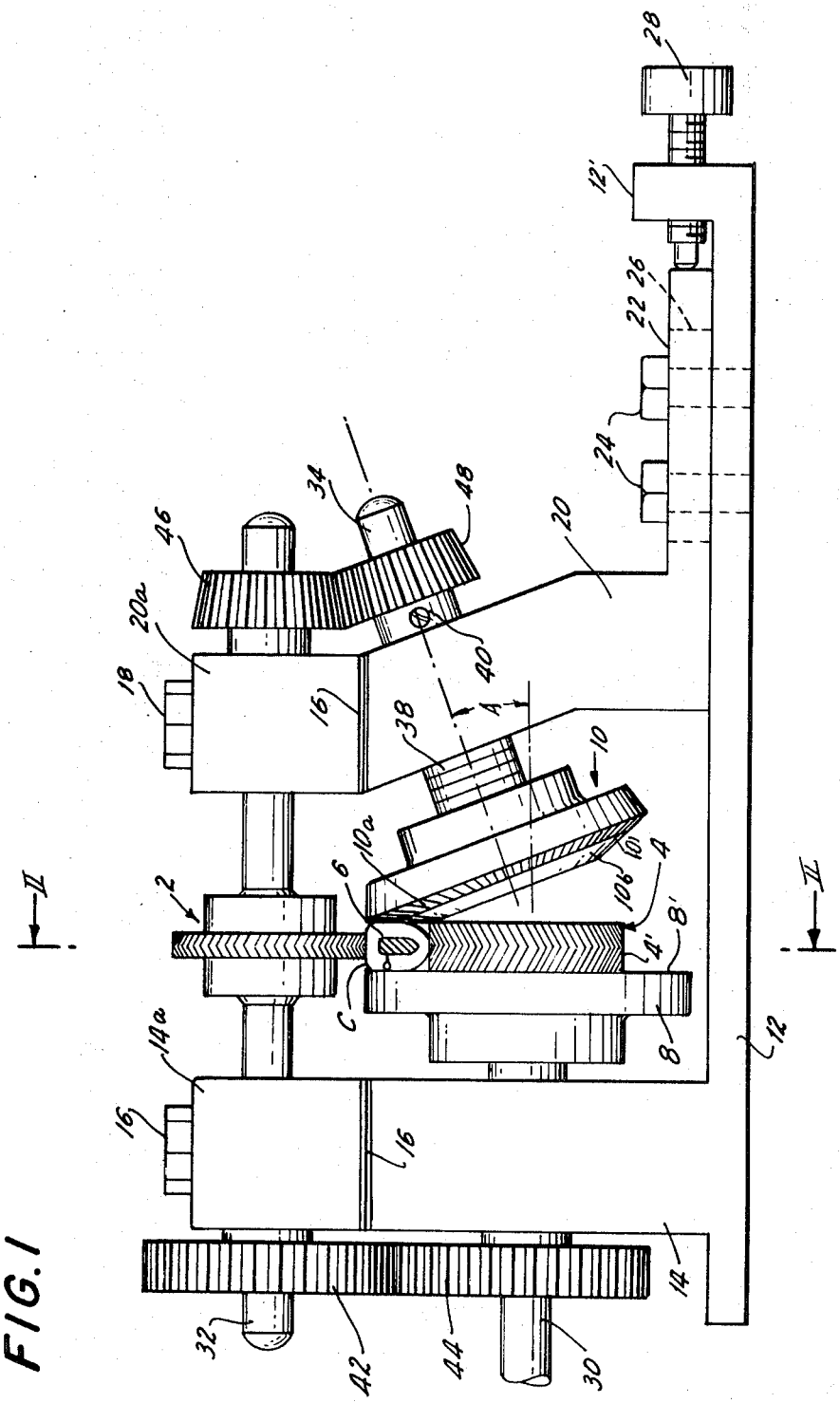
FIG. 1 is a schematic side view of the apparatus according to the present invention.
Figure 2:
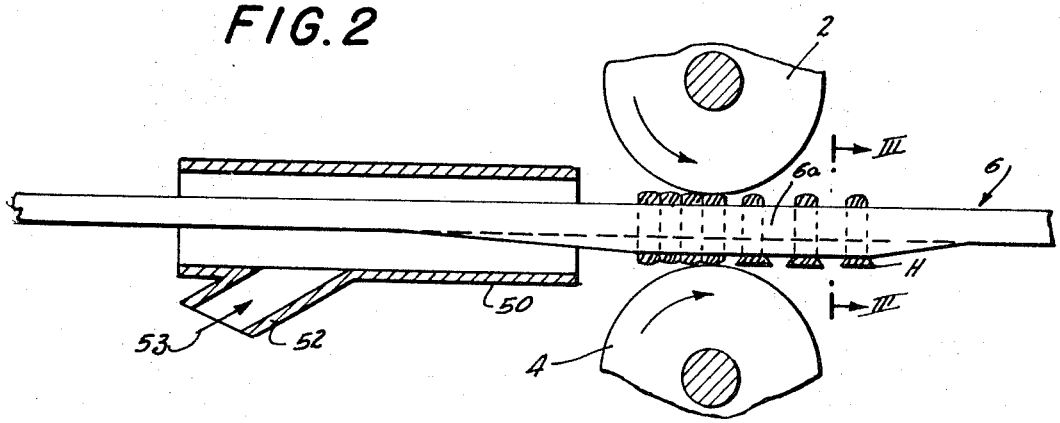
FIG. 2 is a partial cross section of the apparatus shown in FIG. 1 taken along the line II—II of FIG. 1.
Figure 3:
FIG. 3 is a cross section taken along the line III—III of FIG 2 through the mandrel of the apparatus.

Referring now to the drawings, and more specifically to FIGS. 1–3 of the same, it will be seen that the apparatus according to the present invention for forming interlockable slide fastener stringers from preformed plastic coils includes a pressure roll means comprising a first pair of pressure rolls 2 and 4 mounted for rotation about spaced and parallel axes and having peripheral preferably serrated surfaces 2' and 4' arranged to rollingly engage opposite portions of a coiled filament C loosely wound on a mandrel 6 in a manner not forming part of the present invention and as more specifically described in the copending application Ser. No. 793,363, filed on Jan. 23, 1969. The pressure roll means further include a third pressure roll 8 coaxially arranged with the pressure roll 4 and the pressure roll 8 has a side face 8' adapted to engage the coiled filament C on one side thereof. In addition, the pressure roll means include a fourth pressure roll 10 having an axis including an angle A with the axis of the pressure rolls 4 and 8 and a conical face 10' arranged to engage the filament coil C on the side thereof opposite from the side engaged by the side face 8' of the third pressure roll. The conical face 10' of the fourth pressure roll has preferably a serrated large-diameter peripheral portion 10'a and a smooth small-diameter peripheral portion 10'b.

The pressure rolls 2, 4, 8, 10 are mounted on support means rotatable about their axes and the support means preferably comprise a base plate 12 and a two-part bearing block 14 and 14a upwardly projecting from the base plate in the region of one end of the latter. A plurality of thin spacer plates 16 are sandwiched between the bottom face of the upper bearing block 14a and the top face of the lower bearing block 14 and the two bearing blocks with the spacers sandwiched therebetween are held together by a pair of screws 18, only the front one of which is shown in FIG. 1, which extend through appropriate bores in the upper bearing block 14a and the spacers 16 and which are screwed into correspondingly threaded bores in the lower bearing block 14. The support means further include a lower bearing block 20 having an upper inclined portion and at its lower end a horizontal extension 22 abutting with its lower face against the top face of the base plate 12 and being movable toward and away from the bearing block 14. For this purpose the extension 22 is formed with an elongated slot 26 through which the stems of screws 24, screwed with their lower ends into appropriate threaded bores in the base plate 12, extend so that the lower bearing block 20 is movable towards and away from the bearing block 14 after loosening of the screws 24. A pressure screw 28 extending through a correspondingly threaded bore in an upright extension 12' of the base plate 12 abuts with its left end, as viewed in FIG. 1, against the right end face of the extension 22 so that by turning the pressure screw 28, while the screws 24 are loosened, the position of the bearing block 20 along the base plate may be exactly adjusted. The bearing block 20 carries on its upper face an upper bearing block 20a with a plurality of thin spacer plates 16 again sandwiched between the aforementioned faces and the bearing blocks 20 and 20a with the spacer plates 16 sandwiched therebetween are again held together by a pair of screws 18.

The bearing block 14 rotatably supports in a bearing, not shown in the drawing, a drive shaft 30 on the right end of which, as viewed in FIG. 1, the rolls 4 and 8 are fixedly mounted for rotation therewith and the drive shaft 30 is driven at high speed by drive means, not shown in the drawing, such as for instance an electromotor and an appropriate transmission. The drive from the drive shaft 30 is transmitted to the drive shaft 32, which is turnably mounted in bearings of the upper bearing blocks 14a and 20a and which carries the pressure roll 2 for rotation therewith, by means of a pair of spur gears 42 and 44 respectively fixed to the shafts 30 and 32, whereas the drive from the shaft 32 is transmitted to the shaft 34 mounted for rotation in a bearing in the bearing block 20 and carrying at its inner end the roll 10, by a pair of bevel gears 46 and 48 respectively fixed to the shafts 32 and 34. The position of the pressure roll 10 relative to the side face 8' of the pressure roll 8 may be adjusted, not only by shifting the bearing block 20 in the aforementioned described manner along the upper surface of the base plate 12, but also by shifting the shaft 34 in axial direction and for this purpose the hub of the bevel gear 48 which abuts with its free end against the side face of the bearing block 20 is fixed to the shaft 34 by a set screw 40 so that by loosening this set screw the shaft 34 may be shifted in axial direction, and a plurality of exchangeable annular spacer plates 38 are sandwiched between the right face of the hub of the pressure roll 10, as viewed in FIG. 1, and the opposite face of the bearing block 20.

The elongated rod-shaped mandrel is mounted at its end to to the left of the pressure rolls 2 and 4, as viewed in FIG. 2, on a coiling machine as described in the aforementioned copending application, and intermediate its ends in the region of the peripheral surfaces of the pressure rolls 2 and 4 the mandrel 6 has a downwardly curved back so as to form a portion 6a of enlarged cross section defined, as shown in FIG. 3, by a pair of substantially parallel side faces 6' and a pair of curved faces 6" connecting the side faces at the upper and lower edges thereof, whereby the lower of the curved faces 6" preferably has a radius of curvature which is smaller than the radius of curvature of the upper of the curved faces 6". The plastic filament is loosely coiled in a close spiral or coil in the manner as described in the above-mentioned copending application on the left mandrel portion, as viewed in FIG. 2, and the preformed coil C is moved in the axial direction of the mandrel 6 by the pressure rolls engaging the coil convolutions. As the preformed coil passes over the portion 6a of enlarged cross section of the mandrel, the coil convolutions are stretched transversely to the longitudinal direction of the mandrel and in direction of the longitudinal axis of the substantially oval cross section 6a so that the inner faces of the convolutions of the coil will tightly engage the outer faces of the enlarged portion of the mandrel. The distance between the lower one of the pair of curved faces 6" of the mandrel and the closest point of the peripheral surface 4' of the pressure roll 4 is chosen in such a manner that this distance is slightly smaller than the diameter of the coiled filament so that, as the stressed convolutions of the coil filament pass through the gap formed between the lower one of the curved faces 6″ and the peripheral surface 4′ of the pressure roll 4, the bottom portion of each convolution will be deformed into anchoring heads H protruding to opposite sides of the remainder of the convolution as shown in FIG. 2.

The apparatus includes further heating means for heating the filament coil C before it enters in between the pressure rolls, and such heating means may include a sleeve 50 surrounding the mandrel portion to the left side of the pressure rolls, as viewed in FIG. 2, and the preformed plastic coil thereon with clearance and a tube 52 communicating with the interior of the sleeve and serving to feed hot air from a source of hot air, not shown in the drawing, into the sleeve in direction of the arrow 53 so that the hot air will not only heat the coil on the mandrel 6 but also pass onto the peripheral surfaces of the pressure rolls 2 and 4 to heat the latter.

Figure 4:
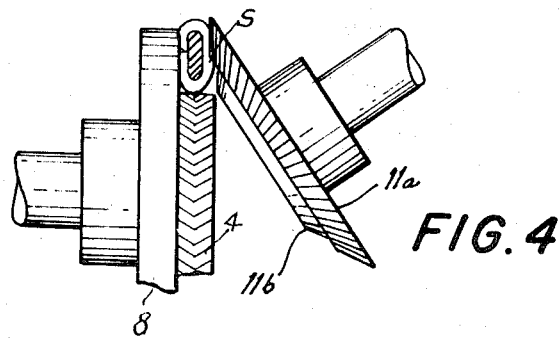
FIG. 4 is a partial view similar to FIG. 1 and showing a modification of the fourth pressure roll.

FIG. 4 partly illustrates a modification of the above-described apparatus. The only difference between the apparatus partly shown in FIG. 4 and the apparatus above described in connection with FIGS. 1–3 is the construction and arrangement of the fourth pressure roll which in the embodiment shown in FIG. 4 is designated with the reference numeral 11. As shown in FIG. 4 the smooth conical peripheral portion is set back with regard to the serrated conical portion 11′a and the latter is arranged with regard to the right side face 6′ of the mandrel portion of enlarged cross section so that the line of contact of the conical surface portion 11′a with the convolutions of the coil C is spaced from the right side face 6′ of the mandrel a distance which is smaller than the diameter of the filament so that the filament portion of each convolution passing through the gap between the conical pressure face 11′a of the fourth pressure roll 11 and the corresponding side face of the mandrel is flattened, whereas at the transition between the conical portion 11′a and 11′b a corresponding shoulder S is formed in each convolution.

The apparatus as described in FIGS. 1–3 will operate as follows:

A plastic filament is coiled in a loose coil C by a coiling apparatus as described in the copending application Ser. No. 793,363 on the left end, as viewed in FIG. 2, of the rod-shaped mandrel 6 and due to the elasticity of the filament, the coil C will not tightly engage the mandrel surface so that the coil can be easily pulled in longitudinal direction by the pressure rolls. Before the coil passes into the region of the pressure rolls it is heated and to a certain degree softened by the heating means 52. As the coil is pulled towards the right, as viewed in FIG. 2, the convolutions thereof are stretched in transverse direction as the convolutions pass over the mandrel portion 6a of enlarged cross section, whereby each coil convolution is slightly notched at its lower portion by the small diameter lower curved surface 6″ of the mandrel. This slightly notched and thus weakened portion of each convolution is then compressed between the lower one of the pair of curved surfaces 6″ of the enlarged mandrel portion and the peripheral surface 4′ of the pressure roll 4 so as to form anchoring heads H thereon. Due to the rotation of the pressure roll 4 in the direction of the arrow as shown in FIG. 2, the right of each anchoring head, as viewed in FIG. 2, will be slightly larger than the corresponding left anchoring head on each convolution. The circumferential speeds of the peripheral surfaces 2′ and 4′ of the pressure rolls 2 and 4 are correlated in such a manner that as portions of the coil are deformed the convolutions of the coil are also pulled apart to the proper spacing so that the anchoring heads on one coil can be properly interlocked with anchoring heads on another coil, and for this purpose the circumferential speed of the pressure rolls 2 in maintained preferably slightly higher than the circumferential speed of the pressure roll 4, which can be obtained by properly choosing the transmission ratio between the gears 42 and 44.

The apparatus partly shown in FIG. 4 will operate in the same manner except that part of each convolution will be flattened and a corresponding shoulder S will be formed at the end of each flattened part.

Figure 5:
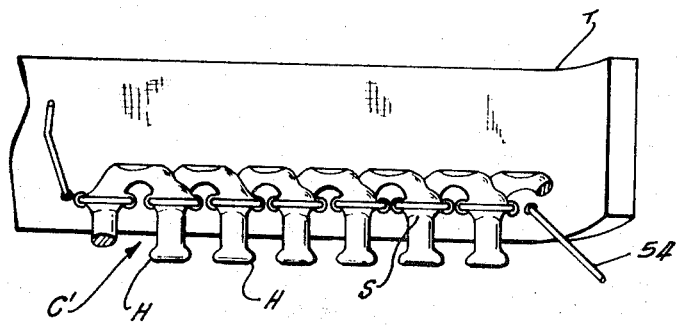
FIG. 5 is a plan view of the finished stringer produced by the apparatus of FIG. 4 and shown attached to a carrier tape.

FIG. 5 shows the deformed coil C′ with the interlock-heads H formed on each convolution fastened by a sewing thread 54 to a carrier tape T. The flattened portion of each convolution produced with the apparatus modification as shown in FIG. 4 will facilitate such sewing of the coil C′ onto the carrier tape T and the shoulder S on each convolution will prevent pushing the coil inwardly with respect to the tape T.

If slide fastener stringers of different size have to be produced by the apparatus of the present invention, it will usually be sufficient to exchange the mandrel 6 against a mandrel of appropriate cross section and to adjust the distance between the axes of the pressure rolls 2 and 4 by removing or exchanging some of the spacer plates 16 and to adjust also the position of the fourth pressure roll 10 or 11 by shifting the lower bearing block 20 along the upper surface of the base plate 12 in the manner as described above and by shifting also the pressure roll 10 or 11 in axial direction by changing the annular spacers 38. During such adjustment of the position of the pressure rolls, the gears 42 and 44 as well as the bevel gears 46 and 48 will usually remain in mesh with each other so that an exchange of these gears will usually not be necessary. If the dimensions of the smallest and the largest stringer to be produced with the apparatus according to the present invention should differ very much, then it will be necessary to change not only the mandrel but at least also the pressure roll 4 and possibly also the gears which establish transmission between the shafts 30, 32 and 34 and to facilitate exchange of the pressure roll 4, the latter is preferably releasably connected in any convenient manner and not forming part of the present invention to the pressure roll 8.

It will be understood that each of the elements described above, or two or more together, may also find a useful application in other types of apparatus for forming interlockable slide fastener stringers differing from the types described above.

While the invention has been illustrated and described as embodied in apparatus for forming interlockable side fastener stringers by a pressure roll means cooperating with an elongated rod-shaped mandrel, it is not intended to be limited to the details shown, since various modifications and structural changes may be made without departing in any way from the spirit of the present invention.

For instance, instead of heating the preformed coil by hot air guided about the coil as described above, different heating means known in the art may also be used for this purpose.

What is claimed as new and desired to be protected by Letters Patent is set forth in the appended claims.

1. Apparatus for forming interlockable slide fastener stringers from a coiled plastic filament, said apparatus comprising an elongated rod-shaped mandrel adapted to receive a coiled filament loosely wound thereon, said mandrel having intermediate its ends an elongated portion having a pair of at least substantially parallel side faces and being provided with a cross section of substantially oval outline larger than the cross section of the remainder of the mandrel so that the coiled filament is transversely stretched in direction of the larger axis of the oval during passing over said mandrel portion of larger cross section; pressure roll means in the region of said portion of larger cross section of said mandrel and arranged to encompass said mandrel and the coiled filament thereon for pressing the transversely stretched filament coil against the outer surface of said mandrel to thereby deform portions of the coil and for stretching the latter in longitudinal direction; support means turnably supporting said pressure roll means; and drive means connected to said pressure roll means for rotating the same.

2. An apparatus as defined in claim 1, wherein said pressure roll means comprise a pair of first pressure rolls mounted on said support means rotatable about substantially parallel axes located in a plane extending substantially normal to the longitudinal direction of said mandrel and having peripheral surfaces engaging the coil at opposite portions thereof, a third pressure roll coaxial with one of the pair of first pressure rolls and having a side face engaging the coil on one side thereof, and a fourth pressure roll having an axis in said plane and inclined at an angle relative to the axis of the said third pressure roll, said fourth pressure roll having a conical face arranged to engage the coil on a side opposite from the side engaged by said third pressure roll along a line substantially parallel to said face of said third pressure roll.

3. Apparatus as defined in claim 2, wherein said larger cross section of said mandrel is further defined by a pair of curved faces connecting said side faces, and wherein said peripheral surfaces of said first pair of pressure rolls press portions of the convolutions of the coil against the curved faces of the mandrel whereas said faces of said third and fourth pressure rolls press portions of each convolution against said parallel side faces of said mandrel.

4. An apparatus as defined in claim 3, wherein one of said curved faces of said enlarged mandrel cross section has a smaller radius of curvature than the other of said curved faces and wherein the peripheral surface of one of said pair of first pressure rolls defines with said one curved surface of said mandrel portion a gap having a minimum distance which is smaller than the diameter of the filament so as to deform the filament portions passing through said gap into interlocking heads extending in longitudinal direction of the coiled filament.

5. An apparatus as defined in claim 4, wherein said peripheral surfaces of said pair of first pressure rolls and said side face of said third pressure roll are serrated.

6. An apparatus as defined in claim 5, wherein said conical face of said first pressure roll has a peripheral serrated portion adjacent the other curved face of said mandrel and a smooth peripheral surface portion adjacent said one curved face of smaller radius of curvature.

7. An apparatus as defined in claim 6, wherein said conical face of said fourth pressure roll is a stepped face with said smooth surface portion set back relative to said serrated surface portion.

8. An apparatus as defined in claim 7, wherein said serrated surface portion of said fourth pressure roll is spaced from the facing side face of the mandrel a distance which is smaller than the diameter of the filament so as to flatten the filament portions passing between the serrated surface portion of the fourth pressure roll and the corresponding portion of the facing side face of said mandrel.

9. An apparatus as defined in claim 2, wherein said fourth pressure roll is mounted on said support means adjustable in the direction of its own axis and in the direction of said parallel axes.

10. An apparatus as defined in claim 9, wherein said support means include exchangeable spacer means for adjusting the distance between said pair of parallel axes.

11. An apparatus as defined in claim 1, and including heating means for heating the coiled filament on said mandrel upstream of said pressure roll means.

12. An apparatus as defined in claim 11, wherein said heating means includes a sleeve surrounding a portion of said mandrel and the coiled filament thereon upstream of said pressure roll means and means for feeding hot air into the interior of said sleeve.

References Cited
UNITED STATES PATENTS

| | | | |
|---|---|---|---|
| 2,368,316 | 1/1945 | Meitner. | |
| 2,525,285 | 10/1950 | Collins | 18—19X |
| 3,133,315 | 5/1964 | Galonska | 18—1X |
| 3,199,162 | 8/1965 | Sohr et al. | |
| 3,207,159 | 9/1965 | Tateisi. | |
| 3,262,157 | 7/1966 | Fujisaki | 18—19 |

J. SPENCER OVERHOLSER, Primary Examiner

R. L. SPICER, Jr., Assistant Examiner

U.S. Cl. X.R.

18—1Z; 264—281